United States Patent [19]

Mery

[11] Patent Number: 5,127,494
[45] Date of Patent: Jul. 7, 1992

[54] DISK BRAKE WITH A THERMALLY INSULATED WORKING CHAMBER

[75] Inventor: Jean-Claude Mery, Pavillons Sous Bois, France

[73] Assignee: Bendix Europe Services Techniques, Drancy, France

[21] Appl. No.: 666,306

[22] Filed: Mar. 8, 1991

[30] Foreign Application Priority Data

Mar. 29, 1990 [FR] France ............... 90 04002

[51] Int. Cl.⁵ .................... F16D 55/22; B60T 17/00
[52] U.S. Cl. .................. 188/71.1; 188/264 G; 92/248; 92/213; 92/222; 192/113 A
[58] Field of Search ............. 188/264 G, 71.6, 72.4, 188/72.5, 370, 71.1; 92/176, 248 X, 213 X, 212, 222 X; 192/113 R, 113 A, 70.12

[56] References Cited

U.S. PATENT DOCUMENTS

| | | | |
|---|---|---|---|
| 2,771,966 | 11/1956 | Davey | 188/264 A X |
| 3,442,356 | 5/1969 | Hahm | 188/72.4 |
| 3,476,221 | 11/1969 | Schanz | 188/152 |
| 3,497,038 | 2/1970 | Schrader et al. | 92/248 X |
| 4,077,499 | 3/1978 | Baram | 188/264 A X |
| 4,085,828 | 4/1978 | Thioux | 188/264 G X |
| 4,456,099 | 6/1984 | Kawaguchi | 188/264 A X |
| 4,581,985 | 4/1986 | Villata | 92/248 |
| 4,583,623 | 4/1986 | Ritsema | 188/71.6 X |

FOREIGN PATENT DOCUMENTS

| | | | |
|---|---|---|---|
| 691668 | 6/1940 | Fed. Rep. of Germany | 188/264 A |
| 3221208 | 12/1983 | Fed. Rep. of Germany | 188/264 G |
| 2548321 | 1/1985 | France . | |
| 59-80536 | 5/1984 | Japan . | |
| 61-45120 | 3/1986 | Japan . | |
| 0149626 | 7/1986 | Japan | 188/264 G |
| 0149627 | 7/1986 | Japan | 188/264 G |
| 8911052 | 11/1989 | PCT Int'l Appl. . | |

*Primary Examiner*—Robert J. Oberleitner
*Assistant Examiner*—Peter M. Poon
*Attorney, Agent, or Firm*—Larry J. Palguta; Ken C. Decker

[57] ABSTRACT

The caliper disc brake comprises at least one hydraulic working chamber (20) intended for spacing apart from one another a piston (16) bearing on one brake shoe (12) and a caliper (18) bearing on the other brake shoe (14). The inner walls of the working chamber (20) are covered with a layer (22, 24) of a thermally insulated material.

6 Claims, 1 Drawing Sheet

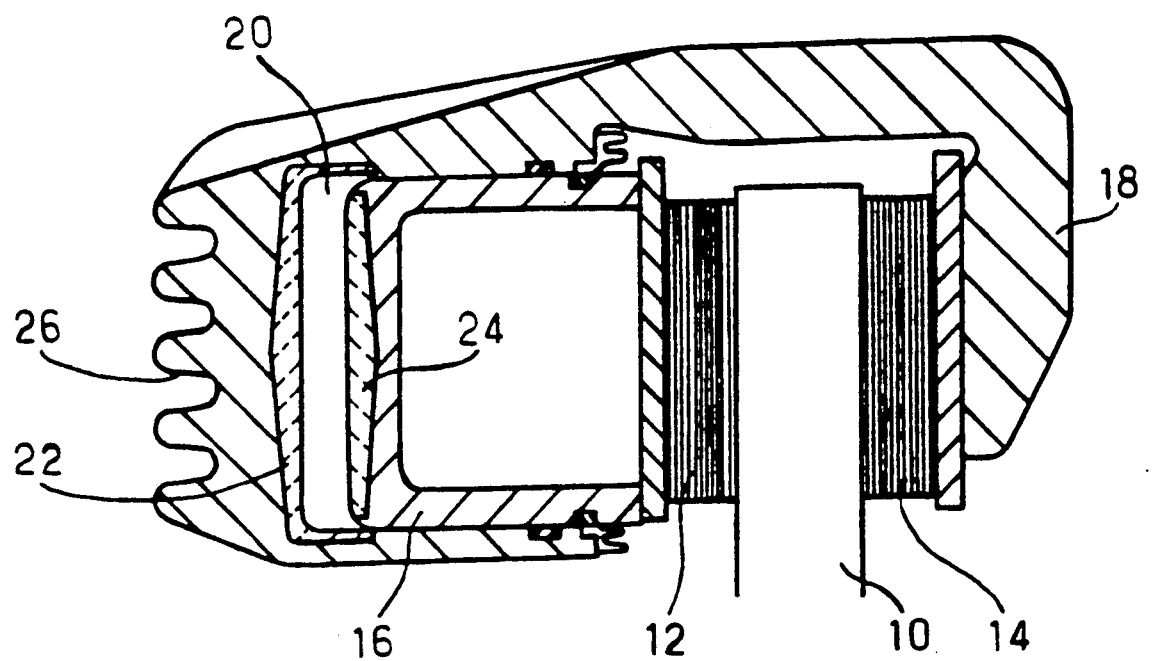

DISK BRAKE WITH A THERMALLY INSULATED WORKING CHAMBER

BACKGROUND OF THE INVENTION

The present invention relates to caliper disk brakes comprising at least one hydraulic working chamber intended for spacing apart from one another a piston bearing on one brake shoe and a caliper bearing on the other brake shoe.

It is known that the heat generated by the friction of the brake shoes on the braked disk is distributed rapidly in the brake as a whole because of the material used for producing the brake. In fact, this material is generally a metal, such as cast iron, intended to withstand very high mechanical stresses.

This heat is thus transmitted to the brake fluid which is located in the working chamber and which can thereby reach its evaporation temperature. Although a liquid is not compressible, vapor by contrast is. This can then result in serious disturbances in the functioning of the brake.

To overcome this problem, the document WO-A-89/11052 proposes using a ceramic piston of low thermal conductivity. However, such a piston is very costly and does not protect the brake fluid from the heat transmitted by the caliper.

With the same aim in view, the document JP-A-61-45120 proposes covering all the parts of the brake facing the disk with a ceramic material. But such a solution does not allow the heat generated on the disk to dissipate by way of the brake itself. This often results in a thermal expansion and burning of the linings.

SUMMARY OF THE INVENTION

The object of the present invention is to overcome these disadvantages by means of a solution which is simple and cheap to put into practice.

According to the invention, the inner walls of the working chamber are covered with a layer of a thermally insulating material.

BRIEF DESCRIPTION OF THE DRAWING

The invention will now be described by way of example with reference to the accompanying drawing in which:

the single FIGURE shows a disk brake according to the present invention diagrammatically in section.

DETAILED DESCRIPTION OF THE INVENTION

Referring now to this single FIGURE, an average person skilled in the art will recognize a disk 10, on the mutually opposite faces of which two brake shoes 12, 14 bear, one 12 by means of a piston 16 and the other 14 by means of the caliper 18. The piston 16 and the caliper 18 between them define a hydraulic working chamber 20 connected to a source (not shown) of fluid under pressure, such as a master cylinder.

According to the invention, this working chamber 20 is thermally insulated by virtue of the fact that its inner walls are covered with a layer 22, 24 of a thermally insulating material. A ceramic is a suitable material of this kind.

Such a layer of a thickness of a few microns can be sprayed by means of a plasma torch. If a layer of a thickness of a few millimeters is desired, it is preferable to apply it by adhesive bonding, for example by means of a ceramic or phenolic adhesive, or by insert in the foundry.

The brake fluid thus circulates in a thermally insulated chamber and therefore has a lower probability of reaching its evaporation temperature. To improve the assembly as a whole, it is possible to arrange cooling fins 26 on the opposite face of the wall of the caliper 18 covered with the insulating layer 22.

Although only one embodiment of the invention has been described, it is clear that an average person skilled in the art can make many modifications to it, without departing from the scope of the invention, as defined in the accompanying claims.

What we claim is:

1. A caliper disc brake comprising at least one hydraulic working chamber intended for displacing relative to one another a piston bearing on one brake shoe and a caliper bearing on another brake shoe, the working chamber having inner walls comprising chamber walls of the caliper and a rear wall of said piston, said working chamber being thermally insulated by means of a layer of thermally insulating material covering substantially all of the inner walls of said working chamber.

2. The caliper disc brake according to claim 1, wherein said thermally insulating material includes ceramic.

3. The caliper disc brake according to claim 1, wherein said layer is applied by adhesive bonding.

4. The caliper disc brake according to claim 1, wherein said layer is applied by insert.

5. The caliper disc brake according to claim 1, wherein said layer is sprayed by means of a plasma torch.

6. The caliper disc brake according to claim 1, wherein an opposite face of one of the inner walls of the caliper covered with said layer is equipped with cooling fins.

* * * * *